May 17, 1949. J. R. WRATHALL 2,470,672
ROTOTROL SCHEME
Filed Nov. 30, 1946
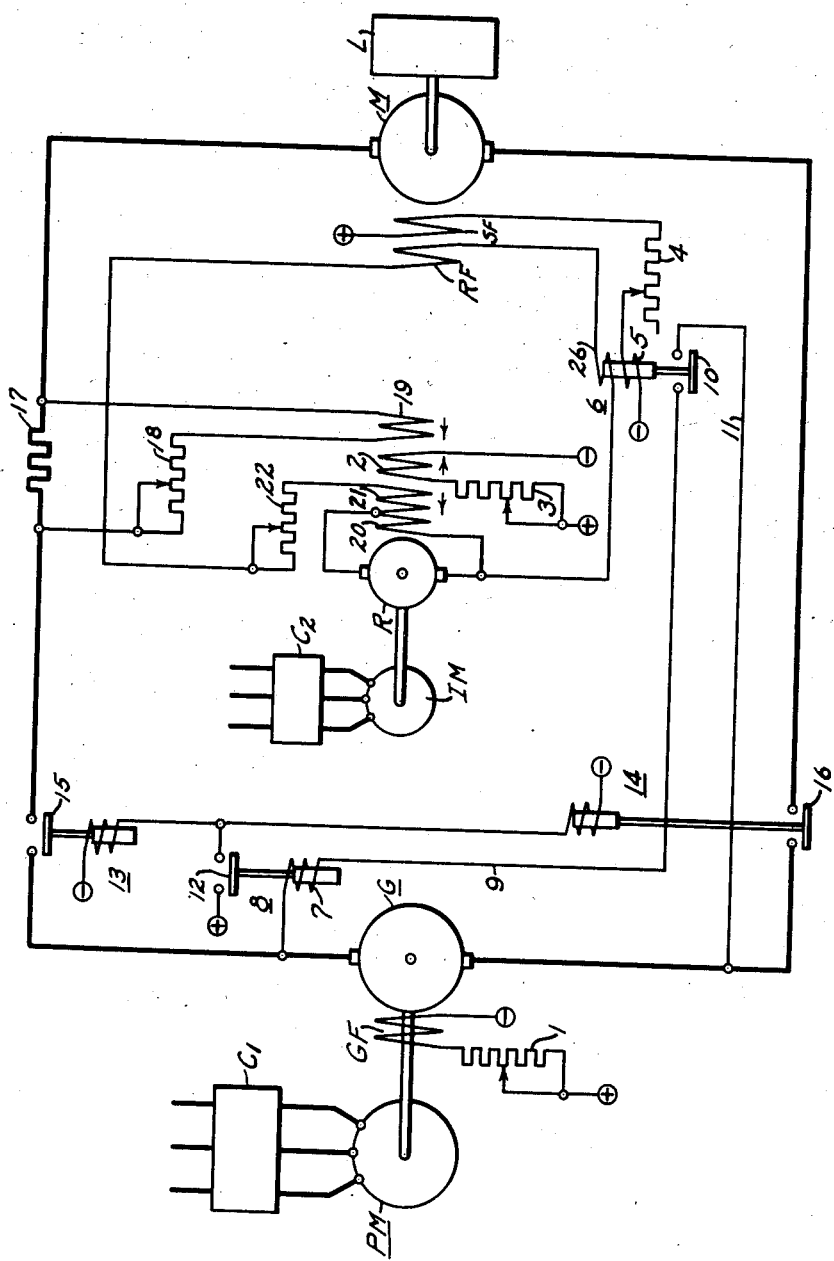
WITNESSES:
Leon M. Garman
Wm. L. Groome
INVENTOR
John R. Wrathall.
BY
Paul E. Friedemann
ATTORNEY Patented May 17, 1949

2,470,672

UNITED STATES PATENT OFFICE 2,470,672

ROTOTROL SCHEME

John R. Wrathall, Pittsburgh, Pa., assignor to Westinghouse Electric Corporation, East Pittsburgh, Pa., a corporation of Pennsylvania Application November 30, 1946, Serial No. 713,321

6 Claims. (Cl. 318—465)

My invention relates to safety features for an electric system, and, more particularly to electric control apparatus for preventing unstable operation of direct current electric motors.

In control systems for direct current motors having two fields, one a constant field, and another field that is regulated from a given maximum value, cumulative to the constant field, down a zero excitation; it is imperative that the regulation of the regulated field is not lost, that the current in the regulated field does under no circumstances reverse, and that protection be provided against excessive motor speed in the event of field failure.

One broad object of my invention is the provision against excessive motor speeds of a direct current motor.

Another object of my invention is the provision of deenergizing the motor armature of a direct current motor in the event of a decrease of the effective excitation of the motor below a selected value.

A still other object of my invention is to provide field loss protection for direct current motors.

It is a specific object of my invention to deenergize the armature winding of a direct current motor having a safe field—a field excited at a constant value and a given sense—and a normally cumulative regulated field, in the event the regulated field is excited in such a manner as to decrease the effective motor excitation below a selected value.

A rather specific object of my invention is the provision of an electromagnetic device responsive to the currents in two electric circuits and operable to effect the deenergization of a third electric circuit when the sum of the effects of the two electric circuits on the electromagnetic device falls below a selected positive value.

Other objects and advantages of my invention will become more apparent from a study of the following specification and the accompanying drawing, in which:

The single figure is a diagrammatic showing of a motor control system embodying my invention.

In the figure, PM represents a prime mover for driving the generator G at substantially constant speed. The generator G is provided with a field winding GF, the excitation of which may be adjusted or varied by the rheostat I to control the voltage of the generator.

The direct current motor M is, in operation, connected to the generator terminals by the main line contactors 13 and 14. The motor M is coupled to a suitable load L which may be considered a winding reel for winding up sheet metal, or paper, or other material at a constant tension. For this type of load the motor speed may have to be varied with changes in the size of the wind-up reel but the tension in the material must remain constant. This would usually mean that the regulation must be such as to maintain constant motor armature current.

The motor M is provided with a safe field SF having control rheostat 4 and a regulated field RF. The usual adjustment of the rheostat 4 is such that for a given, say standard, motor load and given or standard voltage of the generator G the motor M will run at its maximum but safe speed when the excitation of the regulated field RF is zero or at a very small value in the same effective direction as the safe field SF. It is thus readily apparent that a decrease in motor load from the standard, or an increase in generator voltage above the standard, or both, will cause excessive speeds. It is thus the burden of the regulated field RF to provide safe operating speeds for motor load variations, and generator voltage variations, and to control the motor speed for a range of operating speeds below the top motor speed.

To provide the requisite excitation control for the regulated field RF I utilize a regulating generator R, connected in circuit relation with the regulated field RF. This regulating generator, or exciter R is operated by any suitable constant speed motor, as the induction motor IM.

The regulating generator is provided with a pattern field 2 energized to a selected extent in the directional sense indicated by the arrow adjacent to this field.

The regulating generator also has a series field 21 acting in the opposite sense to the pattern field, and is provided with a current field 19 energized as a function of the load current of the main motor M. The current field 19 acts in opposition to the pattern field 2. The regulating exciter is also provided with a stabilizing field 20. The effect of this stabilizing field 20 is relatively small but just sufficient to produce a stabilizing effect to prevent rapid voltage changes of the exciter.

When the system is to be started, the control circuits are first energized. This means the generator field, GF, is energized at a current value determined by the adjustment of the rheostat I; the pattern field 2 of the regulating generator R is energized at a selected current value determined by the adjustment of rheostat 3; an energizing circuit is established for the safe field SF of the motor M through the current adjusting rheostat 4 and the lower coil 5 of the field loss protective relay 6, and the terminals of the other control circuits are supplied with voltage.

Coil 5, of the field loss protective relay 6, is selected on the basis of the minimum allowable ampere turns in the safe field SF which will provide a safe top operating speed for the motor M. For some applications rheostat 4 is not used, but the requirements for coil 5 are still the same, namely, that coil 5 alone be able to operate the relay 6, when the field SF is energized, and that relay 6 drops out when the ampere turns of field SF fall, by a relatively small per cent, below the minimum allowable ampere turns for a safe top operating speed of the motor M.

Relay 6 thus picks up to establish a closed circuit from the positive terminal of the generator G through coil 7 of the control relay 8, conductor 9, contacts 10, and conductor 11 to the negative terminal of the generator G.

Upon operation of the controller $C_1$, the prime mover PM is started to bring the generator G to full speed. The prime mover may be an engine of some constant speed type or a constant speed induction motor as shown. At a relatively low voltage of generator G, as the generator is brought up to full speed the coil 7 of control relay 8 becomes energized sufficiently to cause this relay 8 to operate.

Operation of relay 8 effects the closing of contacts 12 whereupon an energizing circuit is established for the line contactors 13 and 14 by the circuits shown. Operation of the line contactors 13 and 14 effects the closing of contacts 15 and 16, respectively, to thus, while the generator G is being brought up to full speed, connect the motor M to the generator G by the loop circuit shown. The loop circuit includes resistor 17 comprising a shunt for the current field 19 of the regulating generator R. The current field 19 thus provides an excitation to the regulating generator that is a function of the load current of the motor M. The regulating effect of the current field 19 may be adjusted by the rheostat 18.

The controller $C_2$ is now actuated to start the relatively small constant speed motor IM. In practice this is usually an induction motor. The regulating generator R is thus brought up to full speed and builds up a voltage, with the polarities indicated, that is determined by the effective excitation produced by the stabilizing field 20, the series field 21, the pattern field 2, and the current field 19.

An energized output circuit is thus established from the positive terminal of the regulating generator R, through the series field 21, the rheostat 22, the regulated field RF of motor M, actuating coil 26 of the field loss protective relay 6 to the negative terminal of the regulating generator. For the particular application herein discussed and shown in the figure, the excitation of the regulated field RF for a selected or standard, load on the motor M, is substantially equal to the excitation effect produced by the safe field SF. Both fields SF and RF act in the same sense with each field roughly providing half the excitation.

The regulating generator R is a very flexible regulating equipment and can be tuned to provide a regulating current in the regulated field RF that may vary from a given maximum cumulative effect to a given maximum differential effect. For the particular application herein had in mind, the regulating effect on field RF must not become such as to provide a differential effect.

The regulator is thus so tuned that it provides the required excitation of field RF when the magnetic effects of fields 2 and 19 are equal, and opposite as indicated by the arrows adjacent these fields. The self-exciting field, or series field 21, thus carries the burden. The field 20 merely provides a small stabilizing effect, and thus does not enter very materially as a factor in the regulation produced by the regulating generator R.

The load characteristics of the loads electric motors are called upon to operate do not have a constant characteristic. The load variations are often rapid and extreme indeed, so that the effect produced by the current field 19 may vary from a given relatively high value in one direction to a relatively high value in the opposite direction.

When this happens, the effects of all the fields 20, 21, 2 and 19 will be in the same direction which happens to be the wrong direction. The polarity of the regulating exciter R is thus reversed and, in the absence of my contribution to the art, the excitation of field RF is reversed to be differential to the safe field SF and all regulating control is lost. The motor M, since the field RF bucks down the field SF, runs at excessive speeds, that is, may actually run away, or operate as a generator, depending on the magnitude and sense of direction of the motor shaft load at the instant regulation is lost.

The subject matter to which this application is primarily directed, and to which the appended claims are limited, comprises the elements utilized to protect the motor M against loss of field to thus prevent excessive motor speed or unstable motor operation or both. The field loss protective relay and the elements that coact with it accomplish the novel functions.

Relay 6 has the two coils 5 and 26. Coil 5 is, as hereinbefore intimated, so designed that it alone is strong enough, but not excessively so, to pick up the relay armature to close contacts 10 for the minimum current flowing in the safe field SF. The coil 26 is also designed, or selected, to be alone strong enough, but not excessively so, to pick up the relay armature to close the contacts 10, when the current in the coil 26 is in the proper direction and of proper magnitude. The current in coil 26 will be in the proper direction when the terminal voltage of the regulating generator is of the polarity indicated, and the current will be of the proper magnitude when the excitation of field RF is roughly equal to the excitation of field SF. This relation may be true for a given application. The broader and more accurate statement would be that the current in coil 26 is of the proper magnitude when the regulating generator R produces normal regulation for which it is tuned. From the foregoing it will also be apparent that when the current in coil 26 is in the proper direction, the pull of both coils 5 and 26 is in the same direction.

If for any reason the current in coil 26 reverses, then the effect of coil 26 will be opposite to the effect of coil 5. The armature of relay 6 will drop and open the contacts 10. Opening of contacts 10 deenergizes the control relay 8 and the drop-out of this relay 8, through its effect on contactors 13 and 14, thus effects the opening of contacts 15 and 16 to thus disconnect the motor M from the generator G.

Coil 26 is selected on the basis of the minimum allowable ampere turns in the regulated field RF which will provide a safe operating speed. Or stated in terms of the function of coil 26, this means, in the event of failure of field SF, the motor M will continue to run so long as the current in the field RF is equal to or greater than the current required in this field to match the minimum allowable ampere turns in field SF. Should the ampere turns in field RF drop below this value—still considering field SF as having failed—providing for a safe running speed, then the field loss relay 6 will drop out to in turn effect deenergization of the armature of motor M.

From the foregoing disclosure of my invention, it will now be apparent that the motor armature of the load driving motor M becomes deenergized when the effective field excitation decreases below a given value regardless of the cause of such decrease in effective excitation.

While I have shown but one embodiment of the field loss protection, it is readily apparent that others, after having had the benefit of my disclosure, may devise similar systems of control; I do not wish to be limited to but one embodiment, but wish to be limited only by the scope of the claims hereto appended.

I claim as my invention:

1. In a system of control, in combination, a direct current motor having an armature circuit in which the current may vary from a relatively high value in one direction, the normal direction, to a relatively high value in the opposite, or abnormal, direction, a field winding for the motor normally energized to provide a safe maximum speed for the motor when no other excitation effect than this one field is present, a second field winding, a regulating generator connected to said second field winding, said regulating generator producing a voltage that is a function of the current in the armature winding of the motor and being so connected to the second field winding that the second field winding is energized cumulatively to the first field winding so long as the current in the motor armature winding is in the normal direction, an electromagnetic device having two actuating coils, one connected in series with the first field winding and one connected in series with the second field winding, both of said coils acting cumulative when the currents in both the field windings are in the desired direction, and acting differentially to cause the electromagnetic device to become deenergized in the event of a reversal of the polarity of the regulating generator, and means responsive to the deenergization of said electromagnetic device for effecting the deenergization of the motor armature circuit.

2. In a system of control, in combination, a generator and motor connected in a loop circuit, a safe field for the motor energized at a fixed value to provide a safe top operating speed for the motor in the absence of any other excitation for the motor, an electromagnetic switch having two coils, one of the coils being interconnected with the safe field to thus be energized as a function of the current in the safe field, the said one coil being selected to operate the electromagnetic switch upon energization of said safe field, a regulated field for said motor, regulating means for normally varying the excitation of the regulated field from zero to a selected value acting cumulative to the safe field, the second coil of said electromagnetic switch being connected in series with the regulated field and acting cumulative to the first coil as long as the current variations in the regulated field are within the regulation range but to act differentially with respect to the first coil to cause said electromagnetic switch to move to its non-operated position in the event the effect of the regulated field becomes differential, and means responsive to movement of the switch to the non-operated position to effect the opening of the loop circuit.

3. In a system of control, in combination, a motor, a generator for energizing the motor, a loop circuit including the armatures of said motor and generator, a safe field for the motor energized at a fixed value to provide a top safe speed for the motor in the absence of any other excitation, a normally cumulative field for the motor, means for regulating the excitation of the cumulative field over a range from zero field to a given value, and means operable upon a decrease below a given value of the combined ampere turns of said two fields for effecting the opening of the loop circuit.

4. In a system of control, in combination, a motor, a generator for energizing the motor, a loop circuit including the armatures of said motor and generator, a safe field for the motor energized at a fixed value to provide a top safe speed for the motor in the absence of any other excitation, a normally cumulative field for the motor, means for regulating the excitation of the cumulative field over a range from zero field to a given value, an electromagnetic switch having two coils connected, respectively, in series with said field windings and operable upon a decrease below a given value of the combined ampere turns of said two fields for effecting the opening of the loop circuit.

5. In a system of control, in combination, a motor, a generator for energizing the motor, a loop circuit including the armatures of said motor and generator, a safe field for the motor energized at a fixed value to provide a top safe speed for the motor in the absence of any other excitation, a normally cumulative field for the motor, means for regulating the excitation of the cumulative field over a range from zero field to a given value, an electromagnetic switch having two coils connected, respectively, in series with said field windings, each of said coils being selected to operate said switch to closed position when the ampere turns in each of the two fields, respectively, are sufficient to provide a safe top running speed for the motor, but which cause said switch to drop-out to open position when the combined ampere turns of the two fields falls below a value to provide a safe top running speed, and means operable by the opening of said switch for effecting the opening of the loop circuit.

6. In a system of control, in combination, an energized motor armature circuit, a safe field energized at a constant value so as to provide sufficient ampere turns to provide a safe top running speed for the motor, a regulated field wound to act cumulatively to the safe field, means for normally regulating the current of the regulated field to vary the ampere turns of the regulated field from ampere turns that exceed the ampere turns of the safe field to zero ampere turns, and means, responsive to a predetermined decrease of the combined ampere turns of said two fields below the ampere turns providing a safe top running speed for the motor, for effecting the opening of the motor armature circuit.

JOHN R. WRATHALL.

REFERENCES CITED

The following references are of record in the file of this patent:

UNITED STATES PATENTS

| Number | Name | Date |
| --- | --- | --- |
| 1,791,143 | O'Donnell | Feb. 3, 1931 |
| 2,300,988 | Stephenson | Nov. 3, 1942 |

FOREIGN PATENTS

| Number | Country | Date |
| --- | --- | --- |
| 501,716 | Great Britain | Mar. 3, 1939 |